United States Patent [19]

Taig

[11] Patent Number: 4,655,092

[45] Date of Patent: Apr. 7, 1987

[54] TRANSDUCER COUPLING

[76] Inventor: Alistair G. Taig, 19032 Summers Dr., South Bend, Ind. 46637

[21] Appl. No.: 729,837

[22] Filed: May 2, 1985

[51] Int. Cl.$^4$ .............................................. G01L 3/10
[52] U.S. Cl. ................................................. 73/862.35
[58] Field of Search ......................... 73/862.32–862.35

[56] References Cited

U.S. PATENT DOCUMENTS

| 2,754,465 | 7/1956 | Brier | 73/862.31 X |
| 2,909,764 | 10/1959 | Chambers | 73/862.35 X |
| 3,163,037 | 12/1964 | Kawabata | 73/862.32 |
| 3,580,352 | 5/1971 | Hestad et al. | 73/862.33 X |

FOREIGN PATENT DOCUMENTS 0918338  2/1963  United Kingdom ............. 73/862.35

Primary Examiner—Charles A. Ruehl

[57] ABSTRACT

A torque transducer coupling which has a torsion beam coupling an input to an output member, the torsion beam further having an end portion which cooperates with adjacent end portions of the input and output members to effect direct mechanical coupling therebetween when the relative angular movement of the input and output member reaches a predetermined limit thereby preventing excess strain of the torsion beam while allowing use of a torsion beam having sensitive response to torque loads.

10 Claims, 6 Drawing Figures

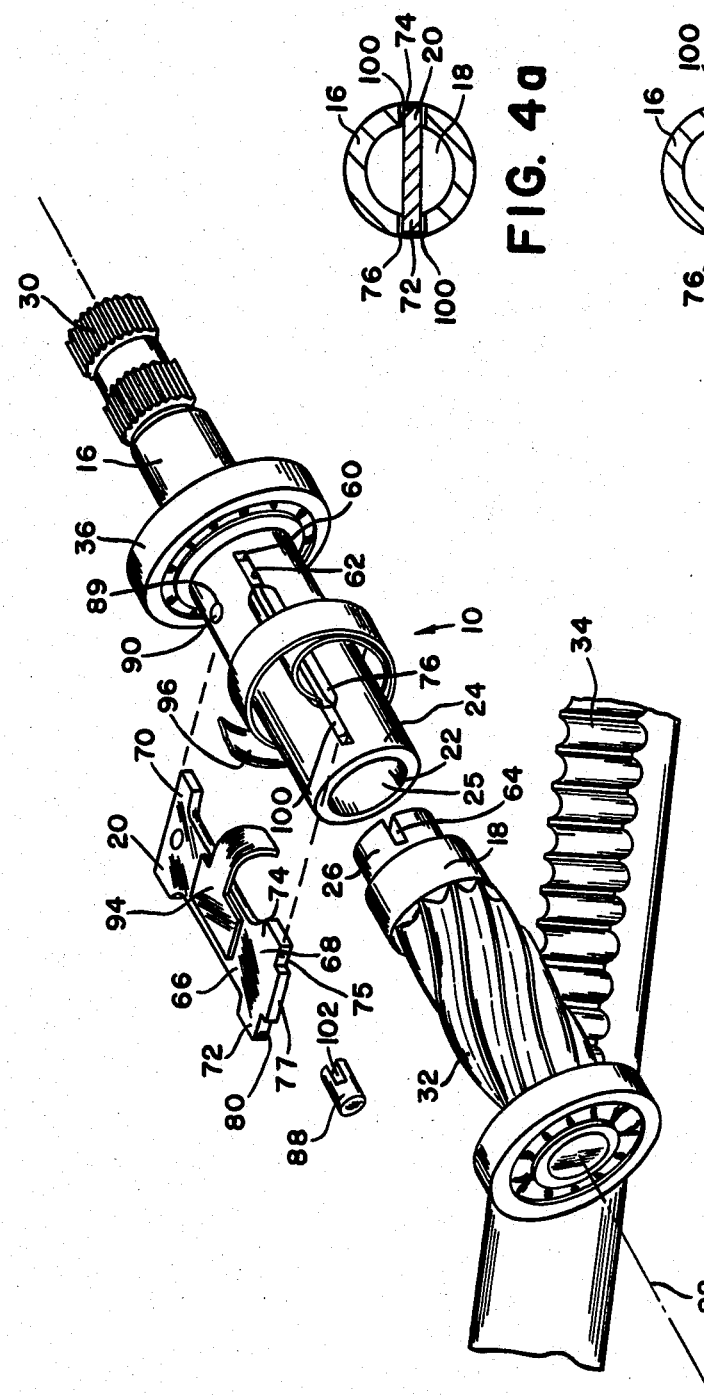
FIG. 2
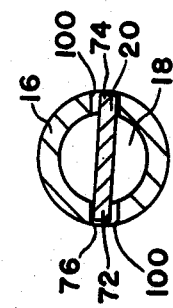
FIG. 4a
FIG. 4b

TRANSDUCER COUPLING

The present invention relates to torque sensors and more particularly to a sensor which produces an electrical signal as a function of the torque applied thereto and simultaniously provides mechanical coupling between two rotatable members.

Torque transducers which generate an electrical signal as a function of the torque applied thereto, are well known. For example, such a torque transducer is disclosed in U.S. Pat. No. 4,415,054, to Gilbert H. Drutchas and assigned to TRW, Inc. Typically, this general type of torque transducer includes an input member and an output member which are connected one to the other by a torsion beam. When torque is applied to the input member, this torque is applied to the output member through the torsion beam thereby providing both a mechanical coupling between the input and output members and imposing a strain on the torsion beam. Various sensing devices such as strain gauges, Hall effect generators, and the like are affixed to the beam or to the beam and related members to produce an electrical signal whose magnitude, frequency, etc. is a function of the strain and, accordingly, the torque applied to the torsion beam. In these structures, it has been the common practice to provide the torsion beam dimensions and configuration such that it functions both as a mechanical coupling between the input and output members and as a deformable element the deformation of which can be sensed to provide the desired electrical torque signal. Because the torsion beam must function both as a mechanical coupling and a deformable element the designer must select a suitable compromise between the strength and mechanical reliability of the torsion member and a member which will exibit sufficient strain under normal loads to provide the desired electrical signal.

In one application of such torque sensors particularly relevant at the present invention, the sensor is utilized as a coupling member in an electrical power steering mechanism, the torque sensor providing a signal indicative of steering forces being applied to the mechanism by a driver. In this application, it will be recognized that the torque sensor, because it also provides mechanical coupling between the steering wheel and the steered wheels of a vehicle, must not fail. Simultaneously, in this application the normal torsion loads applied to the torsion beam may be substantially exceeded in circumstances such as the driver forcing the steering wheel against its stops, the vehicle striking a curb, and the like. When the torsion beam is subjected to such excessive loads, it is essential that the beam be protected against excess strain which could cause damage to the beam and/or the associated transducers affixed thereto. Simultaneously, it is essential that the torsion beam exibit a sufficient amount of strain under normal loads to produce an electrical signal of sufficient definition to enable precise and predictable control of the vehicle.

There exists therefore a need for a torque transducer coupling which simultaniously provides a positive and reliable coupling between an input member and an output member, produces an electrical signal of sufficient magnitude and definition to enable precise control of related mechanisms, and which insures that the torsion beam will not be subjected to excessive stress and strain which could damage the beam and/or its associated transducer elements.

It is also desirable that such a transducer coupling provide a coupling having little or no backlash and which can be easily serviced or replaced.

In its broader aspects, the invention is a torque transducer coupling which comprises an input and an output member co-axially journaled for relative rotational movement. A torsion member connects the input and output members and a lost motion mechanism or coupling means connects the input and output members in response to a predetermined angular movement therebetween. Strain sensing means are fixed to the torsion member for generating an electrical signal as a function of the strain.

More specifically, the transducer coupling is provided with a torsion beam which is fixedly secured at its opposite ends to the input and output members and a portion of the torsion beam positively keys the input to the output member at predetermined angular displacements therebetween whereby strain of the torsion beam is limited to said predetermined angular displacement and the input and output members are resiliently coupled by the torsion beam for relative angular movement having a displacement of less than said predetermined limit.

It is therefore an object of the invention to provide an improved torque sensor coupling.

It is a further object of the invention to provide such a transducer coupling particularly well suited to use in electrically power assisted steering systems.

Another object of the invention is to provide a transducer coupling in which the transducer torsion beam provides a positive deformable coupling between an input and output member between predetermined limits of angular displacement but which positively locks the input to the output member to limit strain of the torsion beam.

Still another object of the invention is to provide a torque transducer coupling in which the torsion beam includes both a deformable portion having a transducer element afixed thereto for providing an indication of torque applied through the coupling and a key portion cooperative with input and output members for positively locking same together when the torque applied to the coupling is at or above predetermined limits.

Another object of the invention is to provide such a transducer coupling which obviates lash or play between the input and output members and which can be easily disassembled for service and/or replacement of components.

These and other objects, features and aspects of the invention will be more fully understood and better described in view of the following specification taken in conjunction with the appended drawings wherein:

FIG. 2 is an exploded perspective view showing key components of the invention;

FIGS. 4a and 4b are diagramatic illustrations useful in explaining operation of the invention.

DESCRIPTION OF THE PREFERRED EMBODIMENTS

Figure 1:
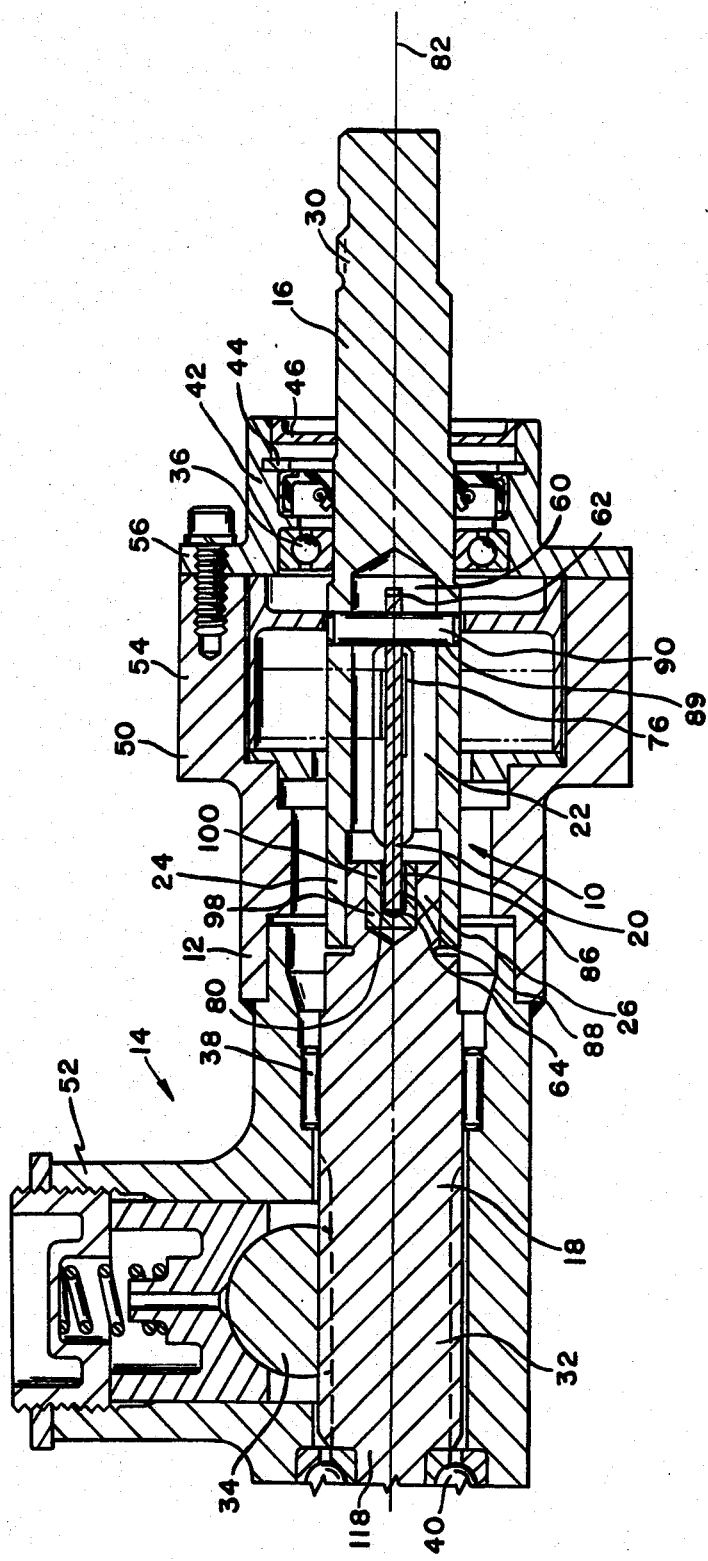
FIG. 1 is an axial cross-section of a transducer coupling in accordance with the invention incorporated in a rack and pinon steering assembly.

Referring now to the drawings, there is shown in FIG. 1 a torque transducer coupling indicated generally at 10 mounted in a housing 12 of a rack and pinion steering gear 14. The transducer coupling 10 comprises generally cylindrical input member 16, output member 18, and a torsion member 20. Input member 16 is provided with an axially extending bore or cavity 22 of stepped diameter extending from its end 24. Output member 18 is provided with an end portion 26 of reduced diameter, which is rotatably received in end portion 25 of the bore 22 by reason of a smooth bearing fit therebetween.

In the illustrated embodiment, the transducer coupling is incorporated in a rack and pinion steering assembly 14 and, accordingly, the input member 16 is shown provided with a splined end 30 adapted to be coupled to the steering wheel of a vehicle through appropriate mechanisms (not shown in FIG. 1) and the output member 18 is provided with a pinion gear portion 32 operatively engaged with a rack gear 34 which is in turn coupled to steerable portions of a vehicle in the conventional manner. Input and output members 16, 18 are further journaled by means of suitable bearings as at 36, 38, 40, seals, retainers and end caps 44, 46, again, in conventional manner. The housing 12 includes rack housing 52, transducer housing 54, and an end cap 56. It is to be understood that these latter elements are adapted for application of the invention to a steering gear assembly. The transducer coupling of the invention may, however, be used in a variety of applications and the housing 12 may be either modified for the particular application or, in some cases, be eliminated.

Output member 18 closes the cavity 22 and, as explained in more detail below, the torsion member 20 is coupled between the end 60 of the cavity 22 and the end 26 of the output member 18.

As can best be seen in FIGS. 1 and 2, end 60 of input member 16 is provided with a slot 62 contiguous with a diameter thereof. A similar slot 64 is provided in the output member 18 in axially spaced registry with slot 62. The torsion member 20, as best seen in FIG. 2, is elongated, and flat with a central portion 66 of reduced lateral dimension. The end portions 68, 70 (FIG. 2 only) define ears as at 72, 74 and the member is interlockingly engaged with the slots 62, 64. Preferably, torsion member 20 is further provided with an axially extending tab portion 77 which has a lateral dimension which engages the interior of the cavity 22.

Input member 16 is further provided with longitudinally extending slots as at 76 having width and length dimensions such that the torsion member 20 can be inserted laterally therethrough, and moved axially towards the output member 18 to the effect engagement of the tab portion 77 with the interior wall of cavity 22.

As can best be seen in FIG. 2, the end of the torsion member 20 which engages the output member 18 is provided with a chamfer as at 80. Member 18 is provided with a recess 86 adjacent the center of slot 64 in which is secured a rubber plug 88 having a slot 102 which is radially displaced from its axis. When the torsion member 20 is inserted through the slots 76 into engagement with the slot 62 of input member 16, and input member 16 and torsion member 20 are axially engaged with the output member 18, the offset in the slot 102 in conjunction with the rubber plug 88, effects a positive lash-free engagement therebetween.

The torsion member 20 is further secured to the input member 16 by means of a press-fitted pin 90 which is inserted through registered holes 89 in input member 16 and torsion member 20.

Figure 5:
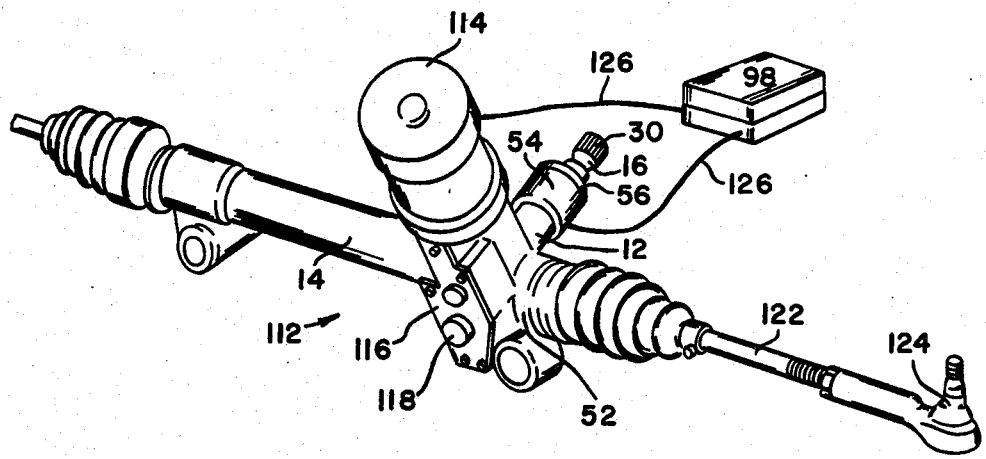
FIG. 5 is a perspective drawing of an electric power assisted rack and pinion steering assembly incorporating the transducer coupling of the present invention.

Lastly, a suitable strain sensitive element such as a strain gauge 94 is fixedly secured to one of the surfaces of the torsion member 20 in conventional manner. In the case of a steering assembly, because the number of revolutions of the unit that can occur is limited, electrical connection to the strain gauge is effected by means of a helically wound flexible conductor cable 96 which extends outwardly through the slots 76 to a suitable control unit 98 (FIG. 5 only).

As can be seen in reference to FIGS. 4a and 4b the end portions 100 of slots 76 have a circumferential dimension that provides a predetermined clearance between the tab portions 72, 74 of the torsion member 20 and the walls of the slot end portions 100.

The unit is assembled by first inserting the torsion member 20 through one of the slots 76 to engage the portion 70 thereof with the slot 62 of input member 16. The torsion member 20 is moved forwardly to engage the tab portion 77 with the walls of cavity 22 and secured in position by means of pin 90. The input member 16 and torsion member 20 are then axially moved into engagement with the output member 18. The chamfer 80 facilitates this assembly. The offset slot 102 of the plug 88 is preferably dimensioned for a tight pressfit with the tab portion 77 such that there is substantially no play between the input and output members. Disassembly is effected in reverse order. Accordingly, it is seen to be simple and easily performed even in the field.

It will now be seen that torque applied to the input member 16 will produce direct mechanical coupling of the torque to the output member 18 through the torsion member 20. This torque will further effect strain in the torsion member 20 which is a function of the torque applied therethrough. This torque is converted to an electrical signal by means of the strain gauge or other strain sensing elements 94, this signal being sent to an appropriate controller as required in the application. The input and output members are journaled, one to the other, and accordingly, relative rotational movement can occur therebetween as the torsion member 20 flexes. However, when strain of the torsion member 20 reaches a predetermined angular value, the tab portions 72, 74 will come into direct physical engagement with the slot end portions 100. This is best seen in FIGS. 4a and 4b in which the position of the torsion member 20 relative to the slot ends 100 is shown in an unstressed and a stressed condition. Further increases in the torque applied to the input member will be communicated by a direct mechanical linkage from the input member 16, to the tab portions 72, 74, to the slot 64 and the output member 18. Accordingly, it will be seen that the tab portions 72, 74 function as keys for effecting a positive mechanical linkage that is totally independent of the torsion member 20 itself. It will also be observed that this linkage is bi-directional.

In a working embodiment, the torsion member beam 20 normally experiences torque loads of zero to forty pound inches. The clearance between the tab portions 72, 74 and slot end portions 100 is designed to accommodate a torque value of plus or minus 60 pound inches at which time the tabs will positively engage the slot end portions 100. These tab portions are normally tested for up to 100 foot pounds of torque. Accordingly, it will be seen that the transducer coupling of the present invention provides a sensitive torque sensing element in normal operating ranges of the device. Simultaneously, the unique mechanical linkage between the input and output members effected through what is, in effect, a lost-motion mechanism comprising slot end portions 100, slot 64, and tab portions 72, 74, prevents overstressing of the torsion member 20 thereby obviating damage or destruction. It will further be seen that even when the assembly is subjected to very high torques, the assembly will return to a totally normal state upon release of the torque as a result of the limitation of the strain on the torsion member. In a working embodiment, engagement occurs after 3 degrees of relative rotation.

Figure 3:
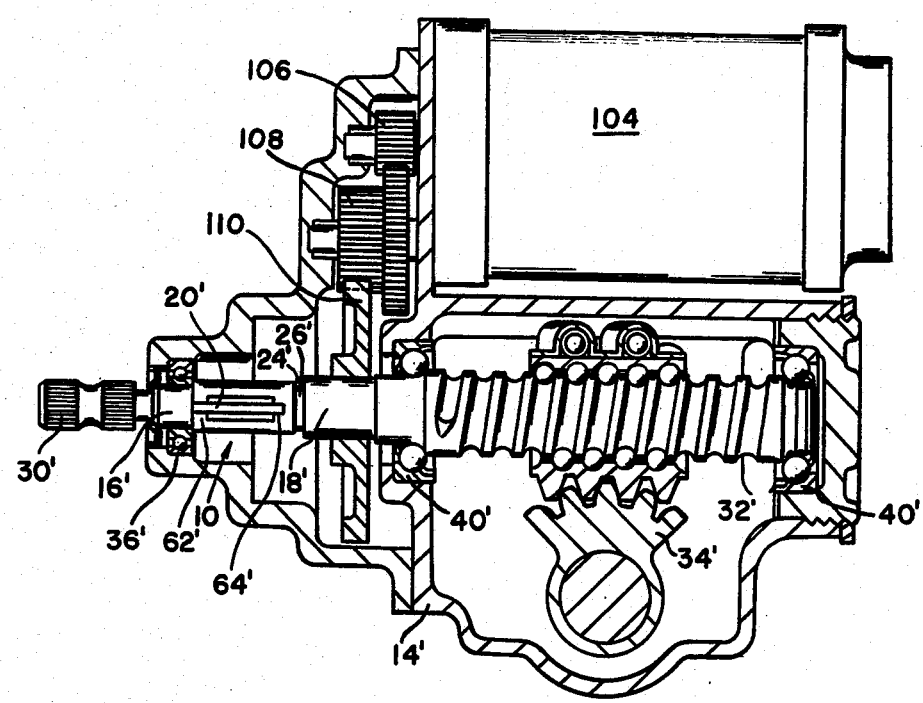
FIG. 3 is an axial cross-section of the transducer coupling shown adapted to a recirculating ball steering mechanism.

Referring now to FIG. 3, the transducer coupling 10 is shown installed in an electric power assisted steering mechanism of the recirculating ball variety. In this embodiment, like components are identified by like primed numerals. It will be seen that in this embodiment, the output member 18' also comprises the recirculating ball pinion shaft for the mechanism. The housing 14' is further modified for adaptation to this type of a steering mechanism. It further will be seen that the steering mechanism is assisted by means of an electric motor 104 which operates through a plurality of gears 106, 108, 110 to apply torque to the output member 18'. It will be observed that the torque is applied to the output member such that it does not apply a torque to the torque sensor 10 but rather reduces the torque that must be applied to the input member 16.

Referring now to FIG. 5, a rack and pinion steering mechanism which includes electric power assist is shown generally at 112. The steering mechanism incorporates a mechanism substantially as shown in FIG. 1. It further will be observed that the electric motor 114 again applies torque to the output member via a gear train (not shown) enclosed within the housing portion 116, this torque being applied to the end 118 of the output member 18 (FIG. 1 only). The rack gear 34 (not shown in FIG. 5) is coupled in the conventional manner to tie rods as at 122 and ball joints 124 to the wheels of the vehicle. The motor control is, again, indicated at 98, the control being coupled to sense or otherwise receive the signal from the strain gauge elements 94 to apply a signal to the motor 114 via conductors 126.

In other applications, not illustrated, it will be recognized that the torque sensor could also be applied between a motor and a driven load such as a generator, machine or the like. In such an appplication, alternative sensors may be substituted for the strain gauge 94 in view of the continuous rotation of the input and output members. Such sensors, are of course well known to those skilled in the art.

Furthermore, it is contemplated that one skilled in the art could make many modifications and/or changes to the invention as described herein without deviation from the essence thereof. As such these modifications and/or changes are intended to fall within the scope of the appended claims.

What I claim is:

1. A torque transducer coupling comprising input and output members coaxially journaled for relative rotational movement, a deformable torsion member resiliently connecting said input and output members; lost-motion coupling means for connecting said input and output members in response to a predetermined angular movement therebetween, said lost motion coupling including co-operatively connected portions of said input, output, and torsion members, said co-operatively connected portions of said input and output member portions each having slots therein, said torsion member portion being fixedly secured in one of said slots and engaging the other of said slots in response to said predetermined angular movement, and strain sensing means connected to said torsion member for generating an electrical signal as a function of the strain thereof.

2. The transducer coupling of claim 1 wherein said input and output member co-operatively connected portions are proximate and journaled one within the other, one of said input and output members having a cavity therein closed by the other of said members.

3. The transducer coupling of claim 2 further including an aperture in the wall of said one of said members in communication with said cavity and dimensioned to receive said torsion member therethrough.

4. The transducer coupling of claim 2 further including coupling means for fixedly securing the end portion of said torsion member distal said co-operating portion thereof to one of said input and output members.

5. The transducer coupling of claim 4 wherein said coupling means is a second slot in said one of said members.

6. The transducer coupling of claim 5 in which said input and said output members are generally cylindrical, said cavity being formed co-axially in said input member and extending from one end thereof, said output member being journaled in the open end of said cavity, one of said slots being formed in the journaled end of said output member and disposed within said cavity, the other of said slots being formed in the wall of said input member in registry with said slot in said output member, said torsion member being a flat beam and having laterally outwardly extending ear portions at one end thereof received in said slot in said input member, there being a circumferential clearance between said slot in said input member and said ear portions whereby said input member may rotate relative to said output member by said predetermined angular movement and said slot in said input member being abuttingly engaged with said ear portions thereafter.

7. The transducer coupling of claim 6 further including an elastomeric element fixedly secured in said slot in said output member and having another slot therein generally co-extensive with said slot in said output member and dimensioned to have an interference fit with said torsion beam.

8. The transducer coupling of claim 7 wherein said slot in said output member is axially symetrical, said another slot in said elastomeric element being radially offset therefrom whereby said torsion beam is laterally stressed against the wall of said slot in said output member by said elastomeric element.

9. The transducer coupling of claim 8 further including a pin extending through said input member and said torsion beam for fixedly securing said beam to said input member.

10. The transducer coupling of claim 9 wherein said torsion beam further includes an axially extending projection at said one end thereof, said projection laterally engaging the interior wall of said cavity.

* * * * *